United States Patent [19]

Usher et al.

[11] Patent Number: 5,378,828
[45] Date of Patent: Jan. 3, 1995

[54] PROCESS FOR PREPARING SOLUBLE ALKALI METAL SALTS OF CELLULOSE SULFATE USING CHLOROSULFURIC ACID AND PYRIDINE

[75] Inventors: Thomas C. Usher, Nassau, Bahamas; Natu Patel; Chhagan G. Tele, both of Boca Raton, Fla.

[73] Assignee: Dextran Products Limited, Scarborough, Canada

[21] Appl. No.: 115,057

[22] Filed: Sep. 2, 1993

[51] Int. Cl.$^6$ .............. C08B 1/02; C08B 3/06; C07H 13/12
[52] U.S. Cl. ...................... 536/59; 536/70; 536/75; 536/83; 536/118; 536/122
[58] Field of Search ............. 536/59, 70, 75, 83, 536/118, 122

[56] References Cited

U.S. PATENT DOCUMENTS

| | | | |
|---|---|---|---|
| 4,141,746 | 2/1979 | Schweiger | 536/59 |
| 4,242,506 | 12/1980 | Schweiger | 536/59 |
| 4,389,523 | 6/1983 | Okajima et al. | 536/59 |

*Primary Examiner*—Nathan M. Nutter
*Attorney, Agent, or Firm*—Sughrue, Mion, Zinn, Macpeak & Seas

[57] ABSTRACT

The present invention provides a process for the preparation of water soluble alkali metal salts of cellulose sulfate having a degree of substitution ranging from 1 to 3 and viscosity of 1 percent aqueous solution in excess of 20 centipoises (cps). The process involves the use of chlorosulfuric acid as a sulfonating agent in the presence of pyridine used as a solvent in reaction. The important steps of the process for preparation of the water soluble salts include presoaking of the cellulose in pyridine followed by washing the pyridine salt with an alcohol such as methanol and reacting saturated alkali metal bicarbonate or carbonate solutions with the sulfonated cellulose.

12 Claims, 1 Drawing Sheet

PROCESS FOR PREPARING SOLUBLE ALKALI METAL SALTS OF CELLULOSE SULFATE USING CHLOROSULFURIC ACID AND PYRIDINE

FIELD OF THE INVENTION

The present invention relates to a process or method of preparing water soluble alkali metal salts of cellulose sulfate.

BACKGROUND OF THE INVENTION

Alkali metal salts of cellulose sulfate are well known water soluble polymers useful in applications such as food additives (thickeners, enhancers), in textiles (sizings), in photographic coatings, in enhanced oil recovery (viscosity modifiers) and lowering cholesterol levels in humans. One known method of preparing alkali metal salts of cellulose sulfate is by reacting cellulose with a large excess amount of sulfuric acid (8-10 parts/part cellulose) in an inert diluent such as toluene with isopropanol to modify the reactivity of the sulfuric acid. The sulfonated cellulose is then exposed to a solution containing alkali metal ions to form the salt of the sulfate.

A drawback to this method, known as heterogeneous esterification is the cellulose does not readily dissolve in sulfuric acid and is thus non-uniformly substituted with sulfate ester groups. Another drawback is that a low degree of substitution occurs (<1.0) of sulfate ester groups on the cellulose polymer backbone. Further, use of the large excess of sulfuric acid is accompanied by a substantial reduction in molecular weight of the cellulose due to degradation by the sulfuric acid.

Another method of preparing cellulose sulfate esters includes the steps of reacting cellulose in a fibrous state in dimethylformamide (DMF) with a preformed 1:1 complex of sulfur trioxide:dimethylformamide ($SO_3$:DMF). In another method cellulose may be reacted with dinitrogen tetroxide ($N_2O_4$) in DMF solvent to form a soluble cellulose nitrite ester which is then reacted with the $SO_3$:DMF complex to form cellulose sulfate esters.

A drawback to both these methods is that $SO_3$ is very difficult to handle as it vigorously fumes in the presence of air and reacts violently when contacted with water and other organic solvents.

Another method of producing cellulose sulfate involves preparing a slurry of cellulose in DMF to which $N_2O_4$ is added to form cellulose nitrite ester. The cellulose nitrite ester can then be easily converted to water soluble cellulose sulfate esters by reaction with a mixture of sulfuric acid-acetic anhydride. A drawback to this method is that it uses large amounts of different chemicals which is not economical in terms of cost and handling of the reagents.

It is therefore advantageous to provide a method of producing alkali metal salts of cellulose sulfate which is both economical, provides a high degree of substitution and does not result in significant degradation of the cellulose.

SUMMARY OF THE INVENTION

The present invention provides a process for preparing alkali metal salts of cellulose sulfate. The process includes the steps of pre-soaking cellulose in pyridine followed by mixing the pre-soaked cellulose with a solution comprising pyridine and an excess of a halogenosulfuric acid in a suitable temperature range. The halogenosulfuric acid is selected from the group consisting of fluorosulfuric acid, bromosulfuric acid and chlorosulfuric acid. The process includes washing the reacted cellulose in an alcohol and then mixing the reacted cellulose with a solution containing an alkali metal ion.

In another aspect of the invention there is provided a process for preparing an alkali metal salt of cellulose sulfate. The process comprises pre-soaking cellulose in pyridine for about 12 hours and then mixing the pre-soaked cellulose with a solution comprising pyridine and an excess of chlorosulfuric acid and reacting the mixture in the range of about 65 to 85 degrees C for about 3 hours. The cellulose is then washed in alcohol and then mixed in a solution containing an alkali metal ion to form an alkali metal salt of cellulose sulfate.

BRIEF DESCRIPTION OF THE DRAWINGS

The process forming the present invention will be better understood with reference to the drawings, in which.

DETAILED DESCRIPTION OF THE INVENTION

Figure 1:
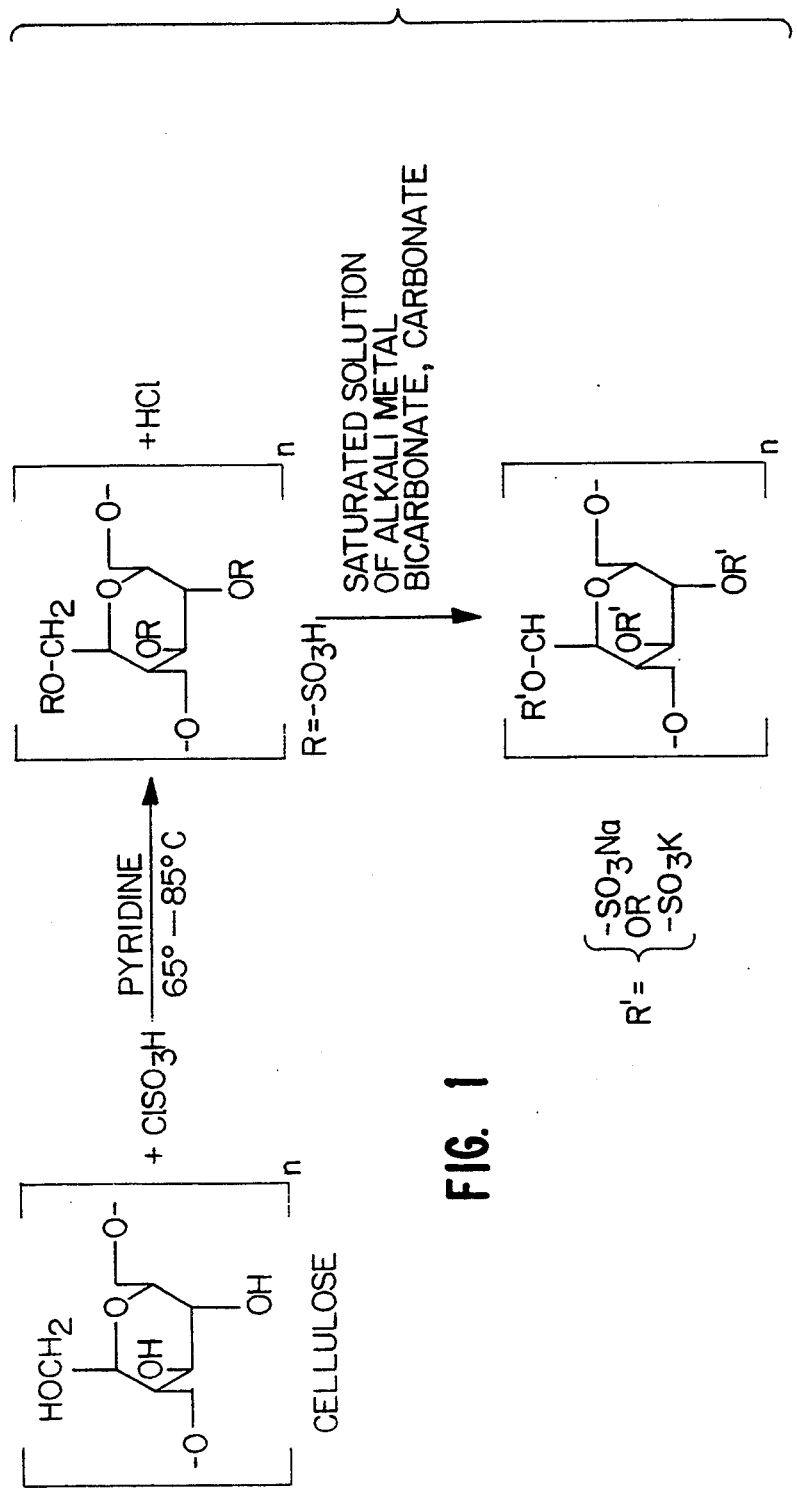
FIG. 1 illustrates an overall reaction scheme to produce alkali metal salts of cellulose sulfate in accordance with the present invention.

The purpose of the process of the present invention is to provide a method of preparing water soluble alkali metal salts of cellulose sulfates at or above room temperature. FIG. 1 shows the overall reaction of the sulfonation of cellulose using chlorosulfuric acid, $ClSO_3H$. Cellulose is first pre-soaked in pyridine, $C_5H_5N$, for about 12 hours at about room temperature. After pre-soaking in pyridine, the cellulose is added to a solution comprising pyridine and chlorosulfuric acid drophite heated to about 50 degrees C. The temperature of the mixture is then raised to between about 65 to 85 degrees and the mixture allowed to react for about 4 hours. After reaction, the pyridine/chlorosulfuric acid solution is decanted and an alcohol is added to the cellulose, mixed well and then decanted. This alcohol washing step, using for example methanol, propanol, ethanol or isopropanol is repeated several times and then the cellulose is added to a saturated solution of alkali metal bicarbonate (or carbonate) and mixed for about 1 hour to give soluble alkali metal salts of cellulose sulfate ester with a high degree of sulfonation and desired viscosity.

The washing steps with alcohol are important since without washing the product is insoluble in water. Upon washing the product in alcohol to remove the various salts and then suspending the product in a saturated solution containing alkali metal ions results in a stable alkali metal salt substantially free of degradation.

Figure 2:
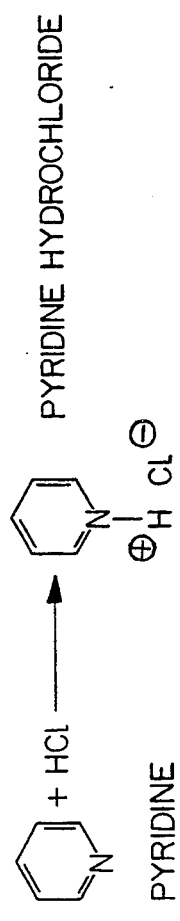
FIG. 2 illustrates the reaction of HCl formed in the reaction of FIG. 1 with the excess pyridine.

The pyridine performs two functions in the sulfonation reaction, the first as a solvent for dissolving the cellulose and the second as an acceptor of hydrochloric acid produced in the reaction mixture between the chlorosulfonic acid and cellulose, see FIG. 2. This formation of pyridine hydrochloride effectively competes with the degradation of cellulose by free hydrochloric acid by removing the free HCl once it is formed.

The process for producing the alkali metal salts of cellulose sulfate forming the present invention is advantageous in that it provides an economical procedure to prepare important water soluble alkali metal salts of cellulose sulfate ester having a degree of substitution of between 1 to 3, there being 3 hydroxyl groups on each cellulose sub-unit. In addition, the process avoids the use of hard to handle sulfur trioxide and further the stable chlorosulfuric acid does not require a specific temperature for storage and use and most importantly is a very stable compound at temperatures higher than 70 degrees C. The reaction of pyridine with HCl avoids acid degradation of cellulose which accompanies sulfonation by $H_2SO_4$.

The following non-limiting example illustrates the use of chlorosulfuric acid as a sulfonating agent for forming sodium or potassium cellulose sulfate.

EXAMPLE 1. 2.5 gm cellulose was soaked for a minimum of 12 hours at room temperature in 20 ml. pyridine.
2. Added 20 ml. pyridine in flask & added 4.5 ml. of chlorosulfuric acid drophite.
3. Raised the temperature of solution to 50 degrees C and then added pre-soaked cellulose.
4. Reacted at 75 degrees C for 4 hours.
5. Decanted pyridine.
6. Added 150 ml. of methanol - mix well - & decanted the supernatant.
7. Again washed with 100 ml. of methanol, i.e. added 100 ml. methanol, mixed well, settled and decanted supernatant.
8. Added saturated solution of sodium bicarbonate up to total value of 200 ml.
9. Mixed it for a minimum of 1 hour.
10. Added 60 ml. of methanol for precipitation, settled & decanted supernatant.
11. Again washed and precipitated with 20 ml. of methanol & decanted methanol.
12. Added water to make a total volume of 500 ml.
13. Filtered the solution.
14. Suspended in 1000 ml. methanol, settled, decanted methanol.
15. Rewashed three times with methanol & dried at 50 degrees C.
16. Final product is characterized by a sulphur content more than 15.0 percent & viscosity of 1.0 percent solution is more than 15 centipoises.

The above example is illustrative only and those skilled in the art will readily appreciate that other reagents and reagent volumes may be used, and that temperature ranges and reaction times may be considerably varied to give the same overall result. For example, other halogenosulfuric acids such as flourosulfuric acid ($FSO_3H$) and bromosulfuric acid ($BrSO_3H$) may be used as sulfonating agents. For these alternative acids, the process would be modified in order to accommodate the physical properties of the particular acid in use and as well may use different chemicals to react with the fluorine and bromine in addition to pyridine.

Therefore, while the process of producing alkali metal salts of cellulose sulfate has been described and illustrated with respect to the preferred embodiment, it will be appreciated that numerous variations of this process may be made without departing from the scope of the invention as disclosed herein.

Therefore what is claimed is:

1. A process for preparing alkali salts of cellulose sulfate, comprising:
    a) pre-soaking cellulose in pyridine;
    b) mixing said pre-soaked cellulose with a solution comprising pyridine and an excess of a halogenosulfuric acid in a suitable temperature range to sulfate said pre-soaked cellulose, said halogenosulfuric acid being selected from the group consisting of fluorosulfuric acid, bromosulfuric acid and chlorosulfuric acid;
    c) washing said sulfated cellulose in an alcohol; and
    d) mixing said washed sulfated cellulose with a solution containing an alkali metal ion.

2. A process according to claim 1 wherein said halogenosulfuric acid is chlorosulfuric acid, and said suitable temperature range is between about 65 to 85 degrees C.

3. A process according to claim 2 wherein said cellulose is soaked in pyridine for about 12 hours.

4. A process according to claim 3 wherein the mixture of cellulose in pyridine and excess chlorosulfuric acid is reacted for about 4 hours.

5. A process according to claim 4 wherein said alcohol is selected from the group consisting of methanol, ethanol, propanol and isopropyl alcohol.

6. A process according to claim 1 wherein said alkali metal ion is selected from the group consisting of sodium and potassium ions.

7. A process according to claim 4 wherein said alkali metal ion is selected from the group consisting of sodium and potassium ions.

8. A process according to claim 7 wherein said solution containing the alkali metal ion is selected from the group consisting of alkali metal bicarbonate and alkali metal carbonate.

9. A process for preparing an alkali metal salt of cellulose sulfate, comprising:
    a) pre-soaking cellulose in pyridine for about 2 hours;
    b) mixing said pre-soaked cellulose with a solution comprising pyridine and an excess of chlorosulfuric acid and reacting said mixture in the temperature range of about 65 to 85 degrees C for about 3 hours to sulfate said pre-soaked cellulose;
    c) washing said sulfated cellulose in an alcohol; and
    d) mixing said washed sulfated cellulose with a solution containing an alkali metal ion to form an alkali metal salt of cellulose sulfate.

10. A process according to claim 9 wherein said solution containing an alkali metal ion is selected from the group consisting of sodium and potassium ion.

11. A process according to claim 10 wherein said solution containing the alkali metal ion is selected from the group consisting of alkali metal bicarbonate and alkali metal carbonate.

12. A process according to claim 9 wherein said alcohol is selected from the group consisting of methanol, ethanol, propanol and isopropyl alcohol.

* * * * *

UNITED STATES PATENT AND TRADEMARK OFFICE
CERTIFICATE OF CORRECTION

PATENT NO. : 5,378,828
DATED : January 3, 1995
INVENTOR(S) : Usher et al.

It is certified that error appears in the above—identified patent and that said Letters Patent is hereby corrected as shown below:

column 4, line 41, delete "2 hours" and insert -- 12 hours --

Signed and Sealed this

Twenty-fifth Day of April, 1995

Attest:

BRUCE LEHMAN

Attesting Officer          Commissioner of Patents and Trademarks